United States Patent
Terada et al.

(10) Patent No.: US 9,304,503 B2
(45) Date of Patent: Apr. 5, 2016

(54) NUMERICAL CONTROL DEVICE CONFIGURED TO REDUCE A MACHINING CYCLE TIME OF A MACHINE TOOL THAT DOES NOT MOVE ALONG Y-AXIS

(75) Inventors: Koji Terada, Tokyo (JP); Masakazu Sagasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 495 days.

(21) Appl. No.: 13/821,904

(22) PCT Filed: May 28, 2012

(86) PCT No.: PCT/JP2012/063615
§ 371 (c)(1),
(2), (4) Date: Mar. 8, 2013

(87) PCT Pub. No.: WO2013/179366
PCT Pub. Date: Dec. 5, 2013

(65) Prior Publication Data
US 2013/0317641 A1 Nov. 28, 2013

(51) Int. Cl.
*G05B 19/18* (2006.01)
(52) U.S. Cl.
CPC .... *G05B 19/182* (2013.01); *G05B 2219/49118* (2013.01)
(58) Field of Classification Search
CPC .................................................... G05B 19/182
USPC ......................................... 700/186, 188, 189
See application file for complete search history.

(56) References Cited

U.S. PATENT DOCUMENTS 6,324,949 B1 12/2001 Link et al.
2005/0042052 A1* 2/2005 Nakazato et al. ............... 409/80

FOREIGN PATENT DOCUMENTS

DE 19904253 A1 8/2000
JP 61-049207 A 3/1986
(Continued)

OTHER PUBLICATIONS

Arthaya et al., "The design and development of G-code checker and cutting simulator for CNC turning operation" Journal of Mechanical Engineering Research vol. 2(3), pp. 58-70, Aug. 2010.*
Xu, "Linear and angular feedrate interpolation for planar implicit curves" Computer-Aided Design Issue 35, 2003 pp. 301-317.*
(Continued)

*Primary Examiner* — Mohammad Ali
*Assistant Examiner* — Emilio J Saavedra
(74) *Attorney, Agent, or Firm* — Sughrue Mion, PLLC; Richard C. Turner

(57) ABSTRACT

A numerical control device controls a machine tool that includes a turret to which a tool is attached, the turret being configured to move along an X-axis and rotate on an H-axis, and further includes a workpiece rotatable on a C-axis. There is no direct movement of the machine tool along a Y-axis that is orthogonal to the X-axis. The numerical control device includes an analyzer that analyzes a y-axis rapid-traverse command in a Y-axis interpolation mode; a C-axis interpolation processor that interpolates a C-axis rotation angle range in response to the analyzed Y-axis rapid-traverse command; and an X-axis interpolation processor that interpolates an X-axis position based on the interpolated C-axis rotation angle range, where the numerical control device rotates the C-axis movement at a constant velocity during the entire C-axis rotation angle range, and accelerates an X-axis velocity of the turret accordingly, to thereby perform an operation.

3 Claims, 11 Drawing Sheets

(56) References Cited

FOREIGN PATENT DOCUMENTS

| JP | 63-293609 A | 11/1988 |
| JP | 02-041801 A | 2/1990 |
| JP | 2000-218422 A | 8/2000 |
| JP | 2003-015713 A | 1/2003 |
| JP | 4888619 B1 | 12/2011 |
| JP | 4902816 B1 | 1/2012 |

OTHER PUBLICATIONS

Hatipoglu "A Feature Based Design Software for Parts to Be Machined in a Four-Axis CNC Lathe" A Thesis Submitted to the Graduate School of Natural and Applied Sciences of Middle East Technical University, Sep. 2005, 163 Pgs.*

German Office Action mailed May 27, 2014, Application No. 11 2012 000 332.2.

* cited by examiner

FIG.7

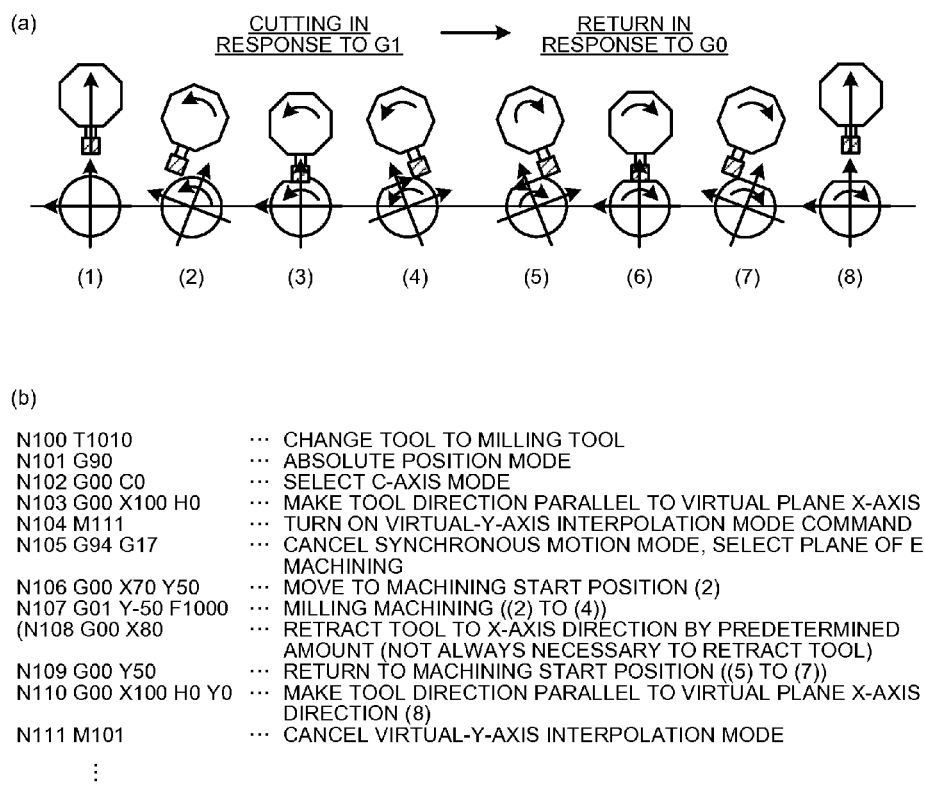

(b)

| | | |
|---|---|---|
| N100 T1010 | ··· | CHANGE TOOL TO MILLING TOOL |
| N101 G90 | ··· | ABSOLUTE POSITION MODE |
| N102 G00 C0 | ··· | SELECT C-AXIS MODE |
| N103 G00 X100 H0 | ··· | MAKE TOOL DIRECTION PARALLEL TO VIRTUAL PLANE X-AXIS (1) |
| N104 M111 | ··· | TURN ON VIRTUAL-Y-AXIS INTERPOLATION MODE COMMAND |
| N105 G94 G17 | ··· | CANCEL SYNCHRONOUS MOTION MODE, SELECT PLANE OF END MACHINING |
| N106 G00 X70 Y50 | ··· | MOVE TO MACHINING START POSITION (2) |
| N107 G01 Y-50 F1000 | ··· | MILLING MACHINING ((2) TO (4)) |
| (N108 G00 X80 | ··· | RETRACT TOOL TO X-AXIS DIRECTION BY PREDETERMINED AMOUNT (NOT ALWAYS NECESSARY TO RETRACT TOOL) |
| N109 G00 Y50 | ··· | RETURN TO MACHINING START POSITION ((5) TO (7)) |
| N110 G00 X100 H0 Y0 | ··· | MAKE TOOL DIRECTION PARALLEL TO VIRTUAL PLANE X-AXIS DIRECTION (8) |
| N111 M101 | ··· | CANCEL VIRTUAL-Y-AXIS INTERPOLATION MODE |

NUMERICAL CONTROL DEVICE CONFIGURED TO REDUCE A MACHINING CYCLE TIME OF A MACHINE TOOL THAT DOES NOT MOVE ALONG Y-AXIS

CROSS REFERENCE TO RELATED APPLICATIONS

This application is a National Stage of International Application No. PCT/JP2012/063615 filed May 28, 2012, the contents of which are incorporated herein by reference in their entirety.

FIELD

The present invention relates to a numerical control device.

BACKGROUND

There are conventionally known, as one model of lathes, lathes (first-model lathes) configured to include a C-axis for grasping a workpiece and controlling a rotation angle, an X-axis for controlling a position so that a turret contacts with or separates from the C-axis, a Z-axis for moving the workpiece in an axial direction of the C-axis, and a Y-axis for machining a flat surface of the workpiece perpendicular to the X-axis. There are also known lathes (second-model lathes) that do not have an actual Y-axis but include a turret-axis (an H-axis) capable of arbitrarily controlling an angle of a C-axis, and include a virtual-Y-axis control function of machining a workpiece in a Y-axis direction by exerting an X-axis-position synchronous and cooperative control over a rotation angle of the H-axis and a distance between the C-axis and the H-axis. Such lathes can perform not only a general turning on the workpiece but also plane machining on a circumferential surface of the workpiece in the Y-axis direction.

In the first-model lathes out of the lathes of the two types of configurations, basically, just by transmitting a rapid-traverse command (G0) to the Y-axis, the Y-axis can operate independently at a G0 velocity as commanded when the Y-axis is to be rapid traversed.

Patent Literature 1 describes a numerical control device for the machining head including the X-axis, the Y-axis, the Z-axis that are three orthogonal linear axes, and the C-axis and an A-axis that are rotation axes. The numerical control device calculates, based on moving amounts of an X-axis, a Y-axis, and a Z-axis, i.e., a moving amount of a tip of the machining head, which are under control of an NC program, actual moving amounts of X, Y, and Z, i.e., a moving amount of a root of a machining head, and outputs the calculated moving amount of the root to X, Y, and Z driving motors. Specifically, the numerical control device analyzes the NC program, extracts the moving amount of the tip for each block, calculates the moving amount of the tip per unit time based on the extracted moving amount of the tip, performs a coordinate conversion by converting the calculated moving amount of the tip per unit time into the moving amount of the root per unit time, and converts the moving amount of the root per unit time into an effective velocity. The numerical control device compares the effective velocity with a maximum velocity, obtains a clamping rate when the effective velocity exceeds the maximum velocity, performs velocity clamping by multiplying a commanded velocity by the clamping rate, and recalculates the moving amount of the tip per unit time. According to Patent Literature 1, the numerical control device can thereby automatically reduce the effective velocity to the maximum velocity of a machine so as to prevent the effective velocity from exceeding the maximum velocity when the effective velocity surpasses the maximum velocity because of a difference between the velocity of the tip of the machining head and the velocity of the root thereof.

CITATION LIST

Patent Literature

Patent Literature 1: Japanese Patent Application Laid-open No. S63-293609

SUMMARY

Technical Problem

The technique described in Patent Literature 1 relates to the first-model lathes including the Y-axis, and Patent Literature 1 does not at all describe the second-model lathes.

Meanwhile, in a case of the second-model lathes, the Y-axis is not present and a combination of C-axis, H-axis, and X-axis operations realizes a Y-axis movement. Accordingly, when the Y-axis is caused to rapid traverse (that is, the workpiece is linearly rapid traversed along the Y-axis), the C-axis, the H-axis, and the X-axis inevitably simultaneously move. As a result, differently from a case of the first-model lathes, even if the difference between the tip velocity and the root velocity of the machining head is negligible, the C-axis velocity exceeds the clamp velocity in some cases.

For example, the second-model lathes execute a virtual Y-axis movement at a constant velocity in response to the virtual-Y-axis rapid-traverse command (G0) when executing the virtual Y-axis movement such as a return operation after machining the workpiece into a D-cut shape. In the second-model lathes, it is necessary to rotate the C-axis at a velocity increasing and decreasing convexly within a range of the rotation angle of the C-axis to execute this virtual Y-axis movement at the constant velocity. At this time, when the C-axis velocity exceeds the clamp velocity at an angle near a center of the rotation angle range of the C-axis, the second-model lathe calculates the clamping rate so that the C-axis velocity is equal to or lower than the clamp velocity within the rotation angle range of the C-axis, and multiplies a Y-axis movement command by the clamping rate. The virtual Y-axis movement velocity is thereby automatically recalculated and revised downward. As a result, the C-axis velocity is reduced as a whole in a block being machined. This possibly increases the execution time of the block being executed, increases the machining cycle time, and reduces machining productivity of the numerical control device.

The present invention has been achieved to solve the above problems, and an object of the present invention is to provide a numerical control device capable of reducing a machining cycle time of a machine tool that does not have a Y-axis.

Solution to Problem

To solve the above problems and achieve an object, there is provided a numerical control device according to an aspect of the present invention that controls a machine tool that includes an X-axis for moving a turret to which a tool is attached, an H-axis for rotating the turret, and a C-axis for rotating a workpiece and that does not have a Y-axis orthogonal to the X-axis, the numerical control device including: an analyzer that analyzes a virtual-Y-axis rapid-traverse command in a virtual-Y-axis interpolation mode in which an X-Y-axis movement command in a machining program is converted into a command in an X-H-C coordinate system, an analysis result of the converted command is interpolated, and the X-axis, the H-axis, and the C-axis are cooperatively driven; a C-axis interpolation processor that interpolates a C-axis angle in response to the analyzed virtual-Y-axis rapid-traverse command; and an X-axis interpolation processor that interpolates an X-axis position based on the interpolated C-axis angle, wherein the numerical control device controls an X-axis position so as to rotate the C-axis while keeping a C-axis velocity to a constant velocity and to enable a virtual Y-axis to move substantially linearly.

Advantageous Effects of Invention

According to the present invention, it is possible to keep the C-axis velocity high as a whole in a block in which the virtual Y-axis movement is made in the rapid-traverse operation, and to execute the rapid-traverse operation of the virtual Y-axis at the high velocity. Therefore, it is possible to effectively reduce the execution time of the block being executed. This can thereby reduce the machining cycle time of the machine tool that does not have the Y-axis.

BRIEF DESCRIPTION OF DRAWINGS

FIG. 7 depict machining procedures of the D-cut according to the first embodiment.

DESCRIPTION OF EMBODIMENTS

Exemplary embodiments of a numerical control device according to the present invention will be explained below in detail with reference to the accompanying drawings. The present invention is not limited to the embodiments.

First Embodiment

A numerical control device 1 according to a first embodiment is explained.

The numerical control device 1 is a numerical control lathe that controls a machine tool MT by numerical control (hereinafter, also "NC"), and machines a workpiece WK by controlling the machine tool MT. The numerical control device 1 performs a so-called D-cut machining on a workpiece WK in a cylindrical shape, for example. The D-cut machining is to linearly cut off a part of a circular cross-section of the cylindrical workpiece WK along a Y-axis so as to have a letter-D shape in a cross-sectional view. At this time, because the machine tool MT according to the present embodiment does not have a Y-axis, the numerical control device 1 virtually realizes a Y-axis control necessary to machine linear portions by using an X-axis, a C-axis, and an H-axis in place of the Y-axis that is not present.

Specifically, the machine tool MT has a configuration as shown in FIGS. 1(a) and 1(b). FIGS. 1(a) and 1(b) are a perspective view and a front view, respectively, depicting relevant parts and a coordinate system of the machine tool MT. The machine tool MT includes a turret TR and a workpiece WK. The machine tool MT includes an X-axis, a Z-axis, an H-axis, and a C-axis. For example, the X-axis is a moving axis for moving the turret TR, so that the H-axis contacts with or separates from the C-axis. For example, the Z-axis is a moving axis for moving the cylindrical workpiece WK in a direction of its central axis and is orthogonal to the X-axis. The H-axis is a rotation axis for revolving a tool by rotating itself. For example, the C-axis is a rotation axis for rotating the cylindrical workpiece WK in a circumferential direction. The machine tool MK does not have the Y-axis. That is, although the Y-axis is a non-existent axis, the Y-axis is a virtual moving axis used in a virtual-Y-axis interpolation mode in a machining program created by a user and is orthogonal to the X-axis and the Z-axis respectively. The virtual-Y-axis interpolation mode is a control mode for converting an X-Y-axis movement command in the machining program into a command in an X-H-C coordinate system, interpolating an analysis result of the converted command, and cooperatively driving the X-axis, the H-axis, and the C-axis.

Figure 1:
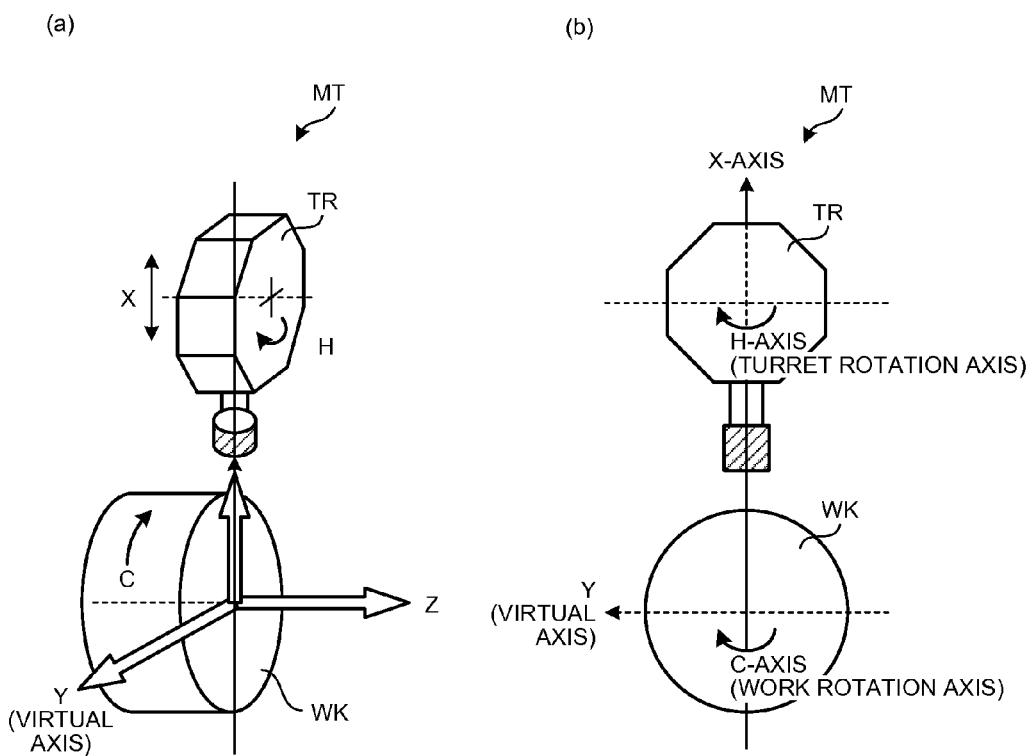
FIG. 1 depict configurations of a machine tool according to a first embodiment.

For example, if the machine tool MT that does not have the Y-axis is controlled to perform a D-cut machining in a virtual Y-axis direction, a combination of operations performed by the C-axis, the H-axis, and the X-axis realizes a Y-axis movement as shown in FIG. 7. That is, FIG. 7(a) depicts a machining procedure in a case of performing the D-cut machining on the workpiece WK in response to a D-cut machining command (G1) and of returning the tool by a rapid-traverse command (G0) by use of the machine tool MT configured as shown in FIG. 1. The machine tool MT performs the D-cut machining on the workpiece WK in procedures (1) to (4), and causes the tool to rapid traverse and to return to an original position in procedures (5) to (8). A cutting direction and a return direction of the D-cut machining are serial. It suffices that the directions are opposite to each other, and cutting can start either from left or right (or "+" or "−").

For example, a user creates the machining program shown in FIG. 7(b) so as to realize the machining procedures (1) to (8) shown in FIG. 7(a). As shown in FIG. 7(b), in the virtual-Y-axis interpolation mode since the virtual-Y-axis interpolation mode is turned on until cancelled, the user creates a predetermined machining program by designating coordinate positions on the X-axis and the Y-axis. The user creates the machining program by designating X-Y coordinates or the like on the assumption of a state of, for example, the procedure (2) in FIG. 7, that is, a state where a tool direction matches a virtual plane X-axis without any consideration on rotation of the H-axis and the C-axis.

Figure 10:
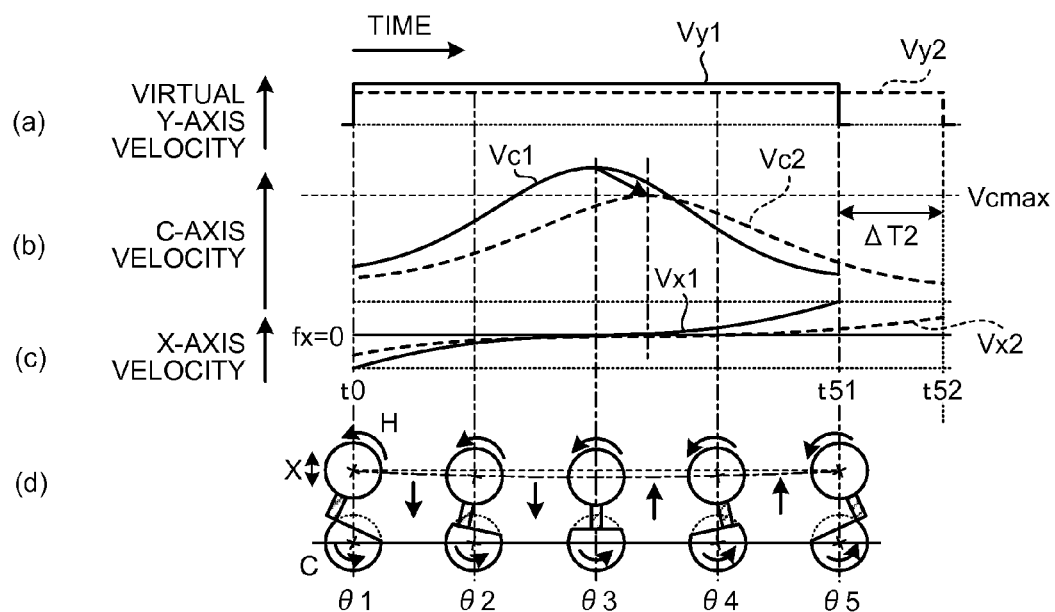
FIG. 10 depict a comparative example 1.

A case (a comparative example 1) where the numerical control device executes a virtual Y-axis movement at a constant velocity Vy1 when the numerical control device executes the virtual Y-axis movement such as the return operation after the D-cut machining in response to the rapid-traverse command (G0) as shown in FIG. 10(a) is considered. In this case, to execute the virtual Y-axis movement at the constant velocity Vy1, the numerical control device needs to change a C-axis velocity Vc1, for example, convexly like a normal distribution curve as shown in FIG. 10(b) in C-axis rotation angle ranges □1 to □5 shown in FIG. 10(d), to change an H-axis velocity similarly as in FIG. 10(b), and to change an X-axis velocity Vx1 like a cubic function curve that is 0 at the angle □3 near a center of the C-axis rotation angle ranges □1 to □5 and that changes from a minus direction to a plus direction. That is, the virtual Y-axis velocity Vy1 shown in FIG. 10(a) is converted into real-axis velocities. That is, the virtual Y-axis velocity Vy1 is converted into the C-axis velocity Vc1, the H-axis velocity, and the X-axis velocity Vx1 shown in FIGS. 10(b) and 10(c).

At this time, for example, as shown in FIG. 10(b), when the C-axis velocity Vc1 exceeds a maximum velocity (clamp velocity) Vcmax in a C-axis permissible velocity range, the numerical control device performs velocity clamping of calculating a clamping rate so that a maximum value of the C-axis velocity Vc1 can be set equal to or lower than the maximum velocity (clamp velocity) Vcmax and of multiplying the Y-axis moving command by the clamping rate. The moving velocity of the virtual Y-axis is thereby automatically recalculated and revised downward to a velocity Vy2 as indicated by a broken line shown in FIG. 10(a) entirely in the C-axis rotation angle ranges θ1 to θ5. Furthermore, a C-axis velocity Vc2, an H-axis velocity, and an X-axis velocity Vx2 into which the virtual Y-axis velocity Vy2 shown in FIG. 10(a) has been converted are also downward revised entirely in the C-axis rotation angle ranges θ1 to θ5 as indicated by broken lines shown in FIGS. 10(b) and 10(c).

As a result, the C-axis velocity in a block being executed gets lower as a whole, so that the execution time of the block being executed becomes longer. As shown in FIGS. 10(b) and 10(c), for example, a timing at which the rotation angle becomes equal to the angle θ5 that is an end of the C-axis rotation angle ranges θ1 to θ5 shifts to t52 after t51. That is, an integral value (a total rotation amount) of the C-axis velocity Vc2 from a timing t0 to the timing t52 is controlled to be equal to an integral value (a total rotation amount) of the C-axis velocity Vc1 from the timing t0 to the timing t51 before clamping. Accordingly, the execution time of the block being executed is longer by ΔT2 than that before the velocity clamping. This possibly increases a machining cycle time of the machine tool MT that does not have the Y-axis and reduces machining productivity of the numerical control device.

Figure 11:
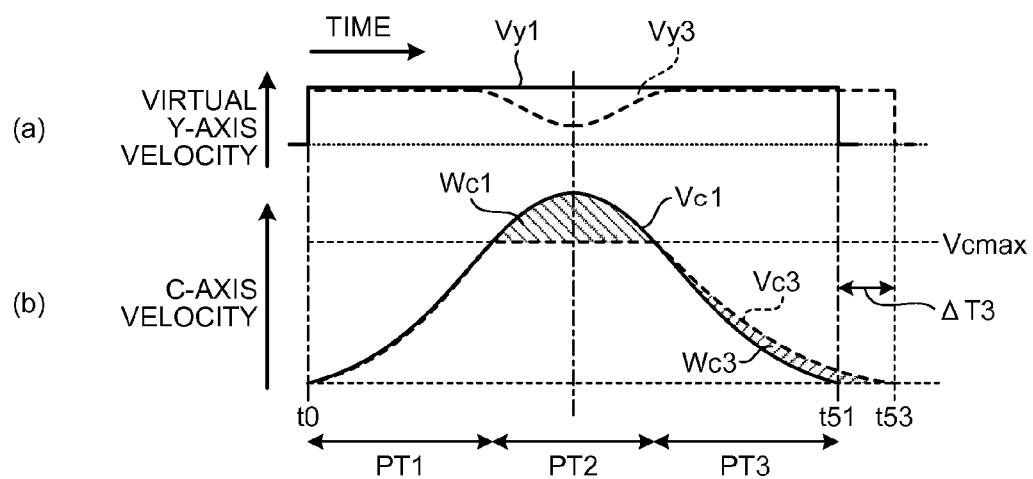
FIG. 11 depict a comparative example 2.

Alternatively, a case (a comparative example 2) is considered. In this case, the numerical control device selectively performs velocity clamping on a region PT2 in which the maximum value of the C-axis velocity Vc1 exceeds the maximum velocity (clamp velocity) Vcmax and not on the other regions PT1 and PT3 while executing the virtual Y-axis movement at the constant velocity Vy1 when the numerical control device executes the virtual Y-axis movement such as a return operation after a D-cut machining in response to the rapid-traverse command (G0) as shown in FIGS. 11(a) and 11(b). In this case, the virtual Y-axis velocity Vy1 becomes a velocity Vy3 revised downward selectively in the region PT2, and the C-axis velocity Vc1 becomes a velocity Vc3 selectively clamped in the region PT2.

At this time, as shown in FIG. 11(b), to compensate for a total rotation amount Wc1 lost by the velocity clamping, it is necessary to increase the total rotation amount of the C-axis by a total rotation amount Wc3 by, for example, selectively smoothing the C-axis velocity Vc1 in the region PT3. The timing at which the rotation angle becomes equal to the angle θ5 that is the end of the C-axis rotation angle ranges θ1 to θ5 shifts to t53 after t51. Accordingly, the execution time of the block being executed is longer by ΔT3 than that before the velocity clamping. This possibly increases the machining cycle time of the machine tool MT that does not have the Y-axis and reduces the machining productivity of the numerical control device.

Therefore, in the present embodiment, the numerical control device 1 executes a control by starting not at executing the virtual Y-axis movement at the constant velocity Vy1 but at executing rotation of the C-axis (a real-axis) at the constant velocity Vc1.

Figure 3:
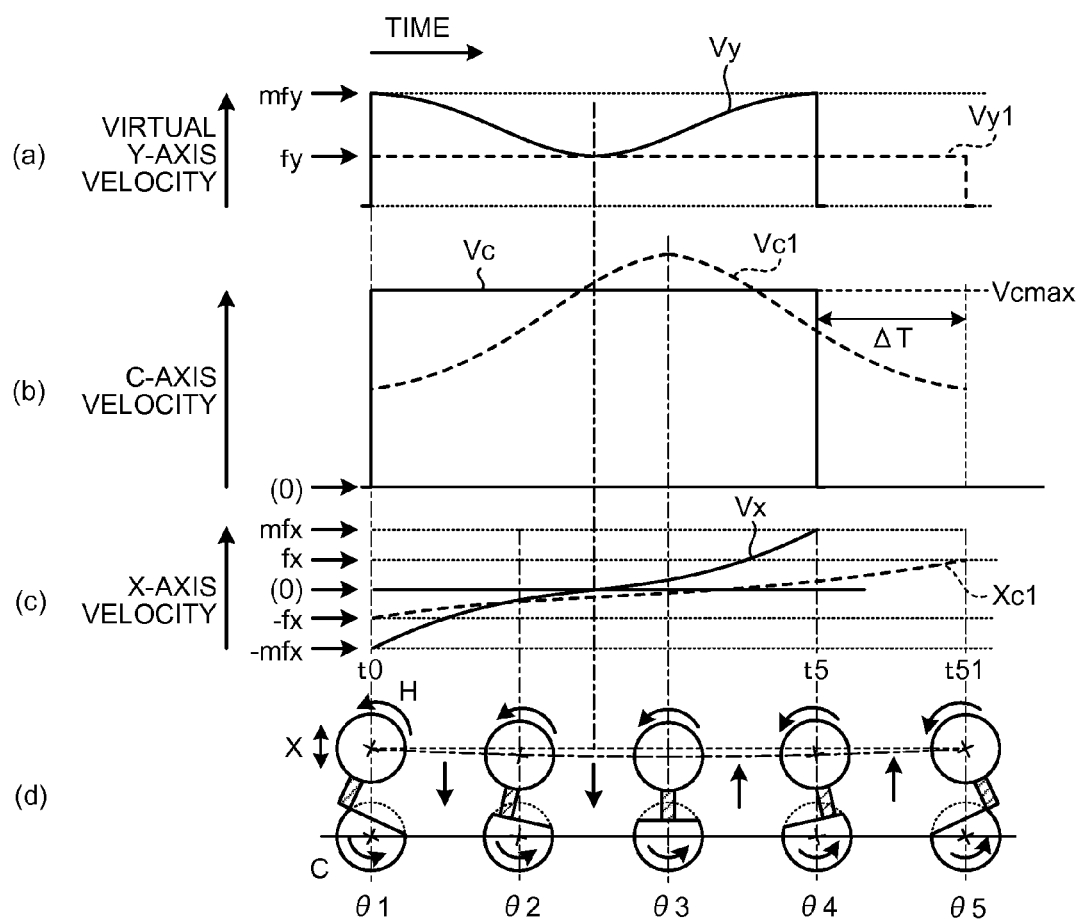
FIG. 3 depict operations performed by respective axes of the numerical control device at a time of a D-cut according to the first embodiment.

Specifically, for example, the numerical control device 1 executes a control as shown in FIG. 3(b). FIGS. 3(a) to 3(c) are examples of operations performed by the respective axes when a rapid-traverse command to cause the virtual Y-axis to rapid-traverse is transmitted in, for example, the virtual-Y-axis interpolation mode. In the virtual-Y-axis interpolation mode, a Y-axis locus is determined based on rotation of the C-axis, rotation of the H-axis, and positional displacement of the X-axis. Because the H-axis and the C-axis are controlled to rotate at an equivalent rotation angle, the C-axis for directly rotating a worked surface of the workpiece is mainly explained here. FIGS. 3(a) to 3(c) depict operations performed by the respective axes before clamping in the comparative examples 1 and 2 by broken lines for comparison purposes.

As indicated by a thick solid line in FIG. 3(b), the numerical control device 1 rotates the C-axis at the constant velocity Vc, that is, the maximum velocity Vcmax in the entire C-axis rotation angle ranges θ1 to θ5, and accelerates an X-axis velocity Vx, accordingly. As a result, a virtual Y-axis velocity Vy that is a combination of the C-axis velocity Vc and the X-axis velocity Vx draws a concave curve as indicated by a solid line in FIG. 3(a). Therefore, the virtual Y-axis velocity Vy exceeds a commanded velocity fy on both ends of the C-axis rotation angle ranges θ1 to θ5. However, this is unlikely to cause mechanical problems because the virtual Y-axis rapid traverses without being accompanied by an actual machining and is a non-existent axis as shown in FIG. 3(d).

As a result, the numerical control device 1 can keep the C-axis velocity in the block being executed to the maximum velocity Vcmax as a whole and can execute the virtual Y-axis rapid-traverse at a high velocity. Therefore, it is possible to effectively reduce an execution time of the block being executed. For example, as shown in FIGS. 3(b) and 3(c), the timing at which the rotation angle becomes equal to the angle θ5 that is the end of the C-axis rotation angle ranges θ1 to θ5 is t5 before t51. That is, an integral value (the total rotation amount) of the C-axis velocity Vc from the timings t0 to t5 is controlled to be equal to that of the C-axis velocity Vc1 before clamping from the timings t0 to t51 in the comparative examples 1 and 2. Therefore, the execution time of the block being executed can be made shorter by ΔT than that before the velocity clamping in the comparative examples 1 and 2. This can thereby efficiently reduce the machining cycle time of the machine tool MT that does not have the Y-axis and improve the machining productivity of the numerical control device.

Figure 4:
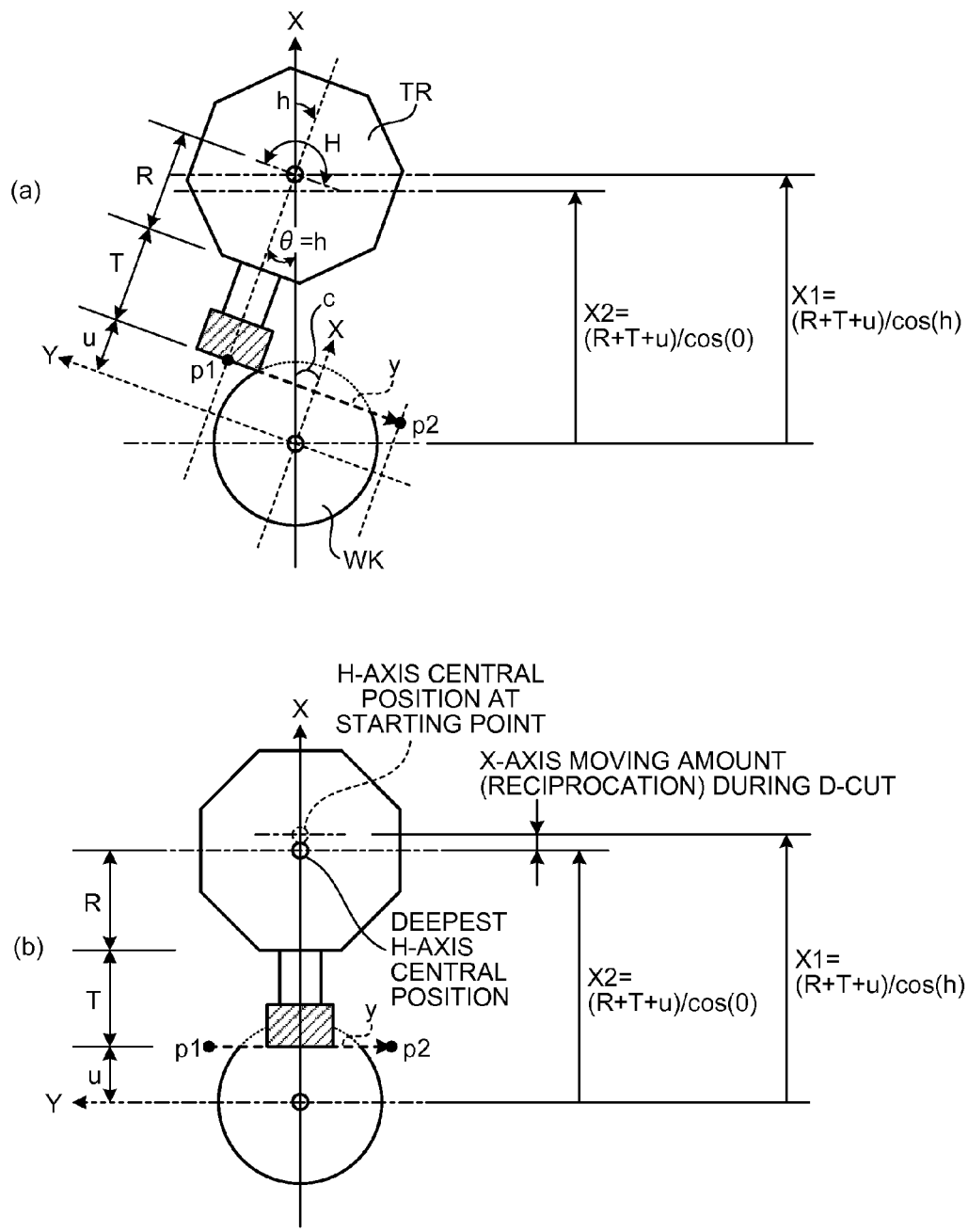
FIG. 4 are exemplary diagrams of elements of the D-cut according to the first embodiment.

FIG. 4 depict the coordinate system, elements, and the like of the Y-axis, the C-axis, the H-axis, and the X-axis in detail. FIG. 4(a) depicts a positional relation at a time of starting the D-cut machining, and FIG. 4(b) depicts a positional relation at an intermediate position of the D-cut machining in detail. In FIG. 4, R denotes a distance from a rotation center of a turret-axis to a tool mounting seat, T denotes a tool length, and u denotes an eccentric amount from a workpiece center. When the machining program designates a machining start position on the virtual Y-axis, the numerical control device 1 makes a tool length correction and a tool diameter correction, obtains a tool central position p1 at a time of the start of machining, calculates a corresponding rotation angle (c=h) of the C-axis and the H-axis and a distance from a center of the C-axis to a center of the H-axis, and controls the axes to move to machining start positions, respectively. Signs x1 and x2 denote an X coordinate value at the time of starting the D-cut machining and that at a time of C=0° (a time of cutting the workpiece WK deepest), respectively. Because the rotation angle h of the H-axis shown in FIG. 4 is a one-side angle with 0° set as a center, it is necessary to calculate a cutting moving amount y of a tool tip by using an angle twice as great as the rotation angle h of the H-axis.

Next, the numerical control device 1 similarly obtains a tool central position p2 at a time of the end of the machining when the machining program designates a machining end position, and linearly interpolates a line connecting the tool central position p1 to the tool central position p2 on a virtual XY plane. Furthermore, the numerical control device 1 finally converts the interpolation data into real-axis positions on the X-axis and the H-axis (rotation axes), outputs the real-axis positions to servo controllers for the respective axes, and drives servo motors. The numerical control device 1 thereby cooperatively performs the rotation of the C-axis, the rotation of the H-axis, and a position control over the H-axis toward a C-axis direction (that is, moves the X-axis). As a result, the machine tool MT can perform a planar machining and a hole drilling on a surface at a position away from a center of the workpiece WK by a designated distance at a right angle with respect to a radial direction.

Figure 5:
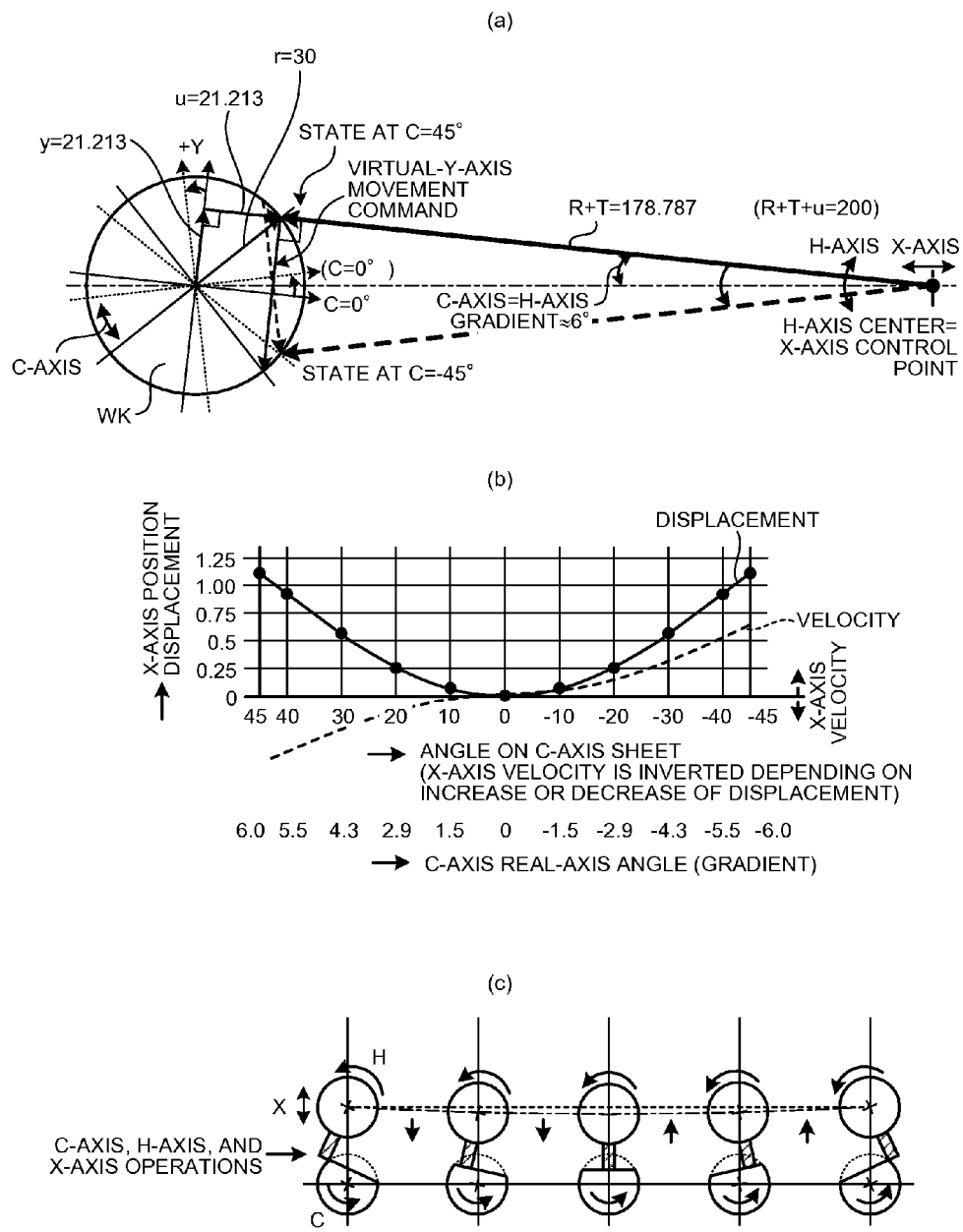
FIG. 5 are relationship diagrams of a C-axis, an H-axis, and an X-axis at a time of the D-cut according to the first embodiment.

FIGS. 5(a) to 5(c) depict a relation among the C-axis, the H-axis, and the X-axis at the time of the D-cut by virtual Y-axis control. FIGS. 5(a) to 5(c) depict positions and angles in detail when the workpiece WK moves from 45° to −45° at R+T+u=200 and a radius of the workpiece WK=30, where R, T, u, and WK are depicted in FIG. 4. For brevity, a tool diameter is assumed as "0".

As shown in FIGS. 5(a) to 5(c), when the tool is to match the workpiece WK having the radius of 30 millimeters at a position of C=45° and a length of a perpendicular line (R+T+u) to a Y-axis position (30×sin 45°=21.213) on the inclined virtual Y-axis that passes from the center of the H-axis to that of the C-axis is 200 millimeters, it suffices that the C-axis and the H-axis are inclined at about 6°. This angle is obtained as expressed by Equation 1 as follows.

$$H\text{-axis gradient}(h) = \tan^{-1}\{r^* \sin\theta_c / (R+T+u)\} \quad \text{Equation 1}$$

Coordinates that correspond to a designated position (θ=45°) of the C-axis viewed from a center of the workpiece WK (radius r=30 millimeters) are virtual Y-axis coordinate=30×sin 45°=21.213, X coordinate=30×cos 45°=21.213. At this time, an angle at the center of the H-axis is $\tan^{-1}$ (21.213/200)=6.054°.

An X-axis displacement (x) is obtained based on (R+T+u)/(cos(h)). When the H-axis rotates from +6° to −6°, the X-axis draws a curve as indicated by a displacement shown in FIG. 5(b). Furthermore, at this time, because the X-axis makes a reciprocating motion, the X-axis velocity is minus when the tool moves toward the center of the C-axis (a first half) and plus when the tool moves away from the center of the C-axis (a second half) as indicated by a broken line in FIG. 5(b).

Therefore, the numerical control device 1 can promptly realize the Y-axis movement substantially linearly by interpolating the C-axis and the H-axis by the designated velocities from about 6° to about −6°, calculating X positions corresponding to the respective angles of the C-axis that is being interpolated, and moving the X-axis.

General procedures are as follows.

<Output of C-Axis Data>

1. Calculate C-axis angle/C-axis G0FdT=m (round up a remainder) and set the m to a control counter CTc.
2. Integrate the C-axis G0FdT (for dx calculation).
3. Output G0FdT at an interval of IT (control unit time) until the control counter CTc becomes 1.
4. Output a remaining distance (angle) when CTc becomes 1.

<Output of X-Axis Data>

1. Calculate (R+T)×(cos θt)−(cos θt+1)) that serves as a dx value in fx=dx/dt . . . where cos θt is a previous value, calculate a current value cos θt+1 and calculate a difference between cos θt and cos θt+1.
2. Output until the control counter CTc becomes 0 with the dx value set as FdT of the X-axis.

At this time, positions of the respective axes at the interval of the control unit time are calculated according to following Equations 2 to 4. The velocities are values obtained by dividing the difference between a previous position and a current position for every control unit time by a control unit time.

$$\theta = \Sigma F \Delta T \quad \text{Equation 2}$$

$$x = (R+T) \times \cos\theta \quad \text{Equation 3}$$

$$y = (R+T) \times \tan\theta \quad \text{Equation 4}$$

In Equation 2, FΔT denotes, for example, the rotation angle per control unit time in the rapid traverse operation.

Figure 2:
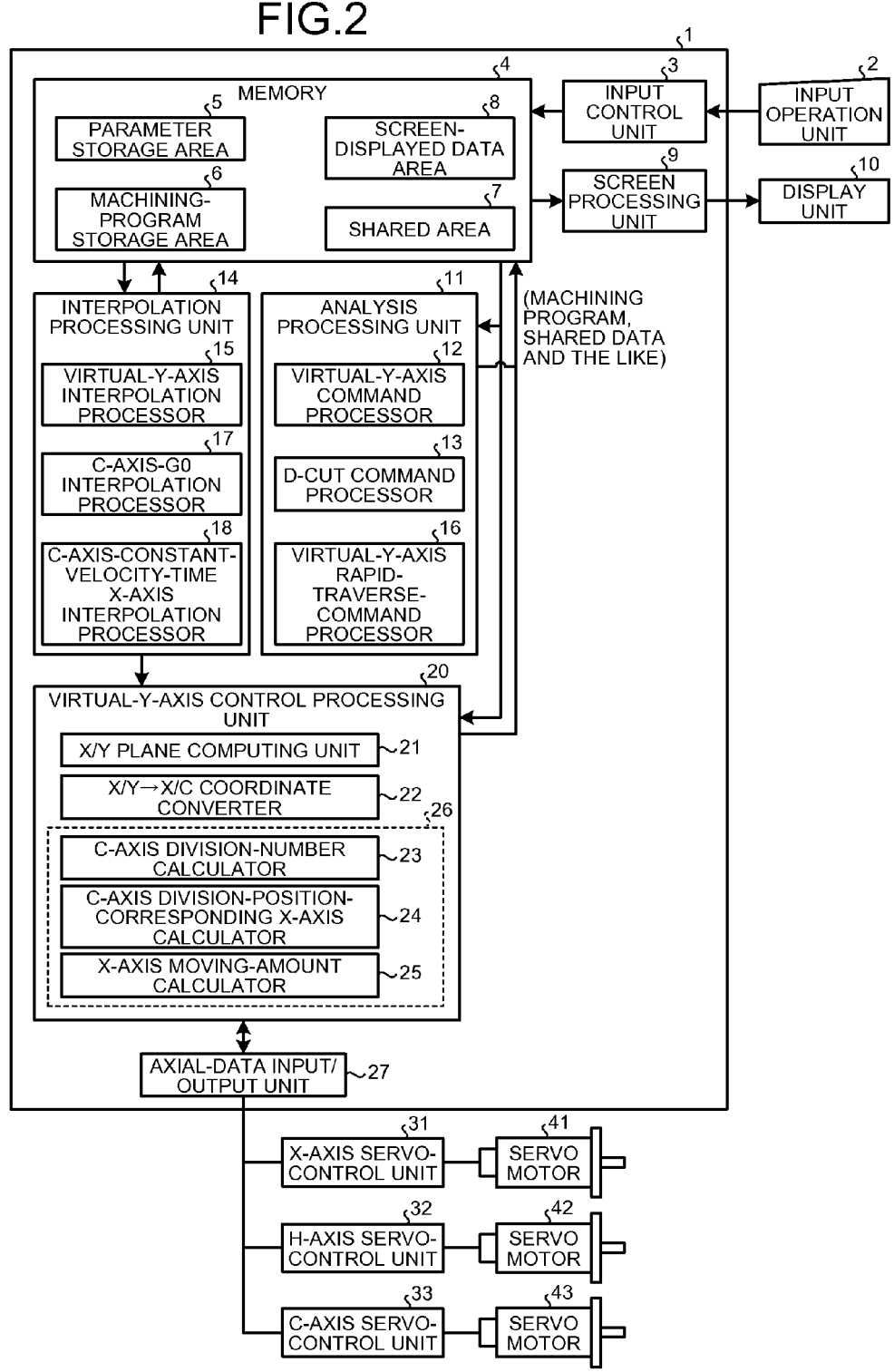
FIG. 2 depicts a configuration of a numerical control device according to the first embodiment.
Figure 6:
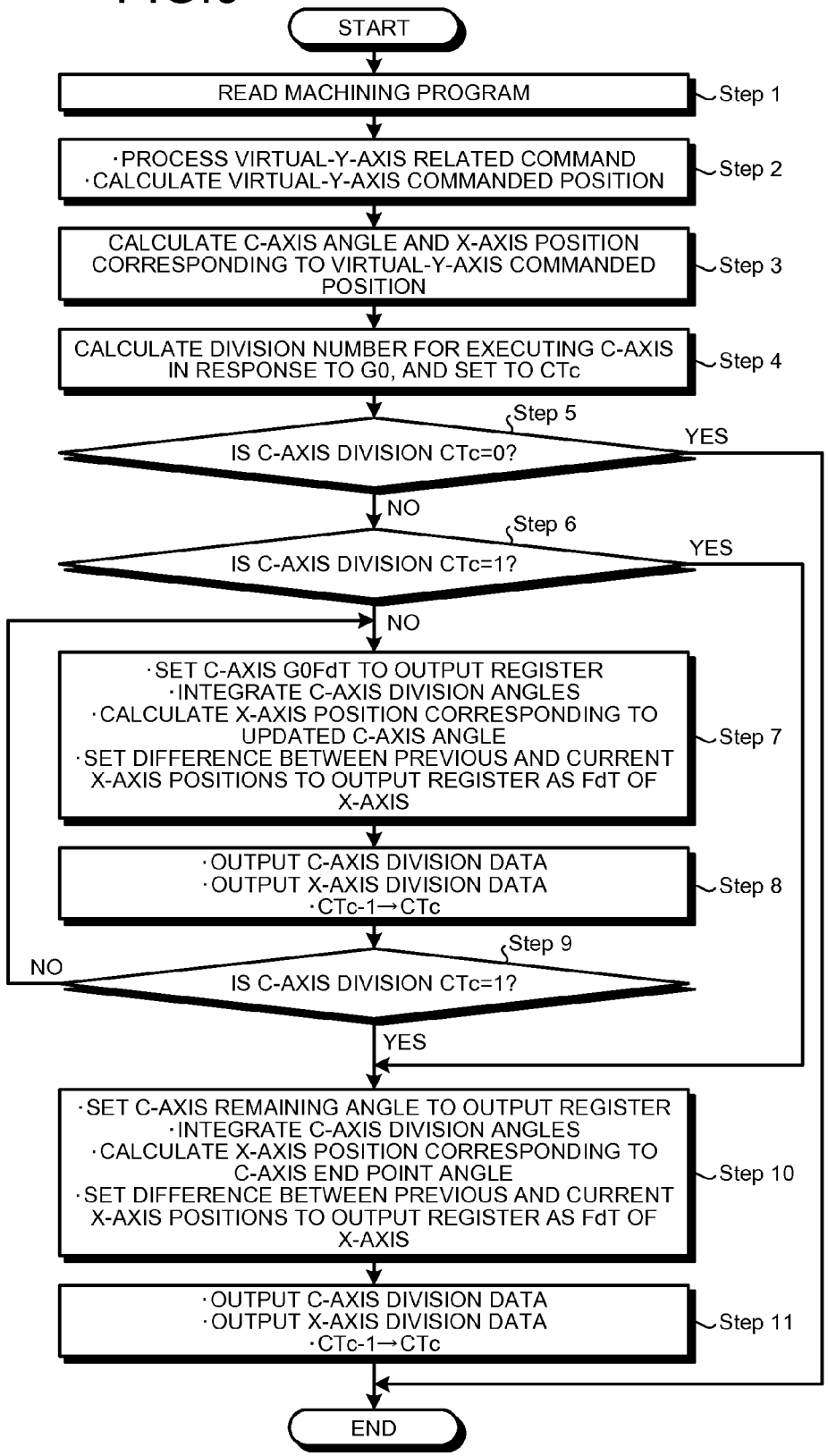
FIG. 6 is a flowchart of a machining procedure of the D-cut according to the first embodiment.

Detailed contents of control are explained next with reference to a block diagram and a flowchart. FIG. 2 is a configuration example of the numerical control device 1 according to the first embodiment. FIG. 6 is an example of a flowchart of a procedure for controlling various processes using this configuration. The content of controls shown here are not executed per control unit time but represented as functions.

The numerical control device 1 includes following constituent elements as shown in FIG. 2.

For example, an input operation unit 2 includes a keyboard or the like and receives a command from a user via the keyboard or the like. An input control unit 3 is an interface for loading an input signal from the input operation unit 2. A memory 4 stores therein various pieces of information. For example, the memory 4 includes a parameter storage area 5 for storing therein parameters necessary for various controls, a machining-program storage area 6 that stores therein the machining program for machining a workpiece, a shared area 7 shared and used by respective controllers appropriately during the control of the numerical control device 1, and a screen-displayed data area 8 for storing therein information to be displayed on a display unit 10. A screen processing unit 9 is an interface for displaying screen-displayed data on the display unit 10.

An analysis processing unit 11 analyzes the machining-program. For example, the analysis processing unit 11 includes a virtual-Y-axis command processor 12, a D-cut command processor 13, and a virtual-Y-axis rapid-traverse-command processor (analyzer) 16.

The virtual-Y-axis command processor 12 analyzes a virtual Y-axis interpolation mode command ("M111" or "M101" shown in FIG. 7(b), for example). The D-cut command processor 13 analyzes the D-cut machining command ("G01 Y-50 F1000" shown in FIG. 7(b), for example). The virtual-Y-axis rapid-traverse-command processor 16 analyzes the virtual-Y-axis rapid-traverse command ("G00Y50" shown in FIG. 7(b), for example).

An interpolation processing unit 14 calculates continuous moving amounts per control unit time of the controlled axes based on the control mode. For example, the interpolation processing unit 14 includes a virtual-Y-axis interpolation processor 15, a C-axis-G0 interpolation processor (C-axis interpolation processor) 17, and a C-axis-constant-velocity-time X-axis interpolation processor (X-axis interpolation processor) 18.

The virtual-Y-axis interpolation processor 15 interpolates the Y-axis position in response to a virtual-Y-axis movement command. The C-axis-G0 interpolation processor 17 interpolates the C-axis angle in response to the analyzed virtual-Y-axis rapid-traverse command. The C-axis-constant-velocity-time X-axis interpolation processor 18 interpolates the X-axis position based on the C-axis angle interpolated by the C-axis-G0 interpolation processor 17. At this time, the C-axis-constant-velocity-time X-axis interpolation processor 18 interpolates the X-axis position so as to, for example, rotate the C-axis while keeping the C-axis velocity to a constant velocity and to enable the virtual Y-axis to move substantially linearly. These interpolation processes are explained later in detail.

A virtual-Y-axis control processing unit 20 includes an X/Y plane computing unit 21, an X/Y→X/C coordinate converter 22, and a D-cut-time Y-axis-rapid-traverse controller 26. The D-cut-time Y-axis-rapid-traverse controller 26 includes a C-axis division-number calculator 23, a C-axis division-position-corresponding X-axis calculator 24, and an X-axis moving-amount calculator 25.

An axial-data input/output unit 27 outputs moving data on the respective controlled axes output from the interpolation processing unit 14 via the virtual-Y-axis control processing unit 20 to an X-axis servo-control unit 31, an H-axis servo-control unit 32, and a C-axis servo-control unit 33. The X-axis servo-control unit 31, the H-axis servo-control unit 32, and the C-axis servo-control unit 33 convert the input moving data into motor drive power and drive servo motors 41, 42, and 43 for the X-axis, the H-axis, and the C-axis, respectively. Furthermore, feedback data from encoders or the like of the respective axis-servo motors are loaded into the memory 4 from the respective axis servo controllers 31, 32, and 33 via the axial-data input/output unit 27 and the virtual-Y-axis control processing unit 20.

Operations performed by the numerical control device 1 configured as shown in FIG. 2 are explained next. Because the C-axis rotation angle is equal to the turret-axis (the H-axis) rotation angle in a D-cut control, the operations are explained while using only the C-axis.

An operator operates the input operation unit 2 according to information such as a guidance displayed on the display unit 10, and sets and selects information necessary for a machining operation as parameters before the machining. Furthermore, the operator prepares for the machining operation such as inputting the machining program from an input device (not shown) into the machining-program storage area 6 of the memory 4 or selecting a desired machining program from a plurality of machining programs and inputting the selected machining program into the machining-program storage area 6.

When preparation for the machining operation is ready, the operator starts the numerical control device 1 to make the numerical control device 1 sequentially read the machining program and analyze and execute the machining program. The analysis processing unit 11 analyzes a program block (that is, each line of the machining program) read from the machining-program storage area 6. For example, in the D-cut mode for the virtual Y-axis control, when the analysis processing unit 11 reads "N104 M111" (where N is a sequence number and M111 is assumed, for example, as the virtual-Y-axis interpolation mode command) in the machining program shown in FIG. 7(b), the virtual-Y-axis command processor 12 operates and actuates the virtual-Y-axis interpolation processor 15 whenever the analysis processing unit 11 reads a Y-axis command until the analysis processing unit 11 reads, for example, M101 that is a virtual-Y-axis interpolation cancel command. In this case, when the D-cut program is input as indicated by N106 to N109, the D-cut command processor 13 operates and the X/Y plane computing unit 21 loads program command values to X-axis and Y-axis coordinate values including a tool correction.

Next, the X/Y→X/C coordinate converter 22 converts the X-axis and Y-axis coordinate values into the C-axis rotation angle and the X-axis position corresponding to the X and Y command values. The virtual-Y-axis interpolation processor 15 converts the converted C-axis rotation angle and the X-axis position into moving amounts per control unit time, and outputs the moving amounts to the respective servo control units via the axial-data input/output unit 27. The respective servo motors are then driven to perform a desired machining.

The virtual-Y-axis rapid-traverse-command processor 16 operates when a rapid-traverse command to the Y-axis is issued during the virtual-Y-axis interpolation mode and the D-cut program. Similarly to a general D-cut, the virtual-Y-axis interpolation processor 15, the X/Y plane computing unit 21, and the X/Y-X/C coordinate converter 22 are actuated to perform a coordinate conversion on the X-axis and the C-axis. The mode is changed to a C-axis priority control mode, and X-axis and C-axis coordinate data (rotation angles) is input to the C-axis-G0 interpolation processor 17. The virtual-Y-axis rapid-traverse-command processor 16 actuates the C-axis division-number calculator 23 included in the D-cut-time Y-axis-rapid-traverse controller 26. The C-axis division-number calculator 23 divides the converted C-axis rotation angle data by a rotation angle (assumed as θdT) per control unit time corresponding to a predetermined constant velocity (the G0 velocity, for example), obtains a C-axis division number (rounds up the remainder), and stores therein the C-axis division number. The predetermined constant velocity is preset to the C-axis division-number calculator 23, for example.

At a time of executing the D-cut, the C-axis-G0 interpolation processor 17 sequentially adds θdT to a C-axis current position (angle) by as much as the division number for every control unit time and outputs θdT to the axial-data input/output unit 27. The C-axis-G0 interpolation processor 17 uses the remaining angle only at the last round.

The C-axis-constant-velocity-time X-axis interpolation processor 18 actuates the C-axis division-position-corresponding X-axis calculator 24 to calculate the X-axis position corresponding to a C-axis division position changing at an interval of a time dT. At this time, the C-axis-constant-velocity-time X-axis interpolation processor 18 calculates the X-axis position by a predetermined conversion equation so as to make the virtual Y-axis locus linear. The X-axis moving-amount calculator 25 calculates a moving amount (assumed as FdT) per control unit time from the difference between a currently-obtained X-axis position and a previous X-axis position, and outputs the calculated moving amount to the axial-data input/output unit 27.

As described in the beginning of this explanation, the H-axis is controlled in response to the same command values as those to the C-axis. Therefore, the H-axis is driven to rotate so that a bottom surface of the tool can be set always perpendicular to a Y-axis surface of the workpiece WK grasped by the C-axis, and the position of the tool relative to the workpiece WK is thereby accurately controlled.

FIG. 6 depicts processing content of the virtual-Y-axis rapid-traverse command (G0) at a time of the D-cut machining during the virtual Y-axis control in the NC device configured as shown in FIG. 2. Similarly to the above, because the H-axis uses calculation results of the C-axis, explanations of the H-axis will be omitted.

At Step 1, the NC device 1 reads the machining program and reads the virtual-Y-axis interpolation mode command (M111 in this example) or the virtual-Y-axis interpolation cancel command (M101 in this example).

At Step 2, the NC device 1 processes the command related to the virtual Y-axis control such as setting a virtual-Y-axis interpolation mode flag in response to the virtual-Y-axis interpolation mode command, or resetting the virtual-Y-axis interpolation mode flag in response to the virtual-Y-axis interpolation cancel command. The NC device 1 also calculates X-axis and Y-axis commanded positions.

At Step 3, the NC device 1 calculates X-axis and Y-axis coordinate positions at which the tool corrections are made to the X-axis and Y-axis commanded positions, and further calculates a C-axis angle and an X-axis position corresponding to these X-axis and Y-axis coordinate positions.

At Step 4, the NC device 1 calculates the C-axis division number (rounds up the remainder) by dividing the C-axis angle corresponding to the Y-axis G0 movement command value by the moving amount (rotation angle) per control unit time, for example, $\theta 0 dT$ corresponding to the C-axis G0 velocity or another set velocity, and sets the C-axis division number to a C-axis division counter CTc (same as the control counter CTc) included in the memory 4.

At Step 5, the NC device 1 checks whether a content of the C-axis division counter CTc is "0" and determines whether a division process is performed for the first time and no data is present or division of the C-axis is completed. When the content is "0" (YES at Step 5), the NC device 1 determines that the process is unnecessary because the division is completed and ends the process. When the content is not "0" (NO at Step 5), the process proceeds to Step 6.

At Step 6, the NC device 1 checks whether the content of the C-axis division counter CTc is "1". This is intended to determine whether the division process that is another process is performed for the last time. Therefore, when the content is not "1" (NO at Step 6), the division process is not the last division process and the process proceeds to Step 7. When the content is "1" (YES at Step 6), the process proceeds to Step 10 at which a remaining distance process is performed.

Steps 7 to 9 are processes for outputting division data by as much as the number calculated previously with the C-axis set at the constant velocity in response to the Y-axis G0 command.

At Step 7, the NC device 1 sets $\theta_0 dT$ corresponding to the G0 velocity to an output register while assuming that the C-axis is driven to rotate at the G0 velocity, for example. Furthermore, the NC device 1 adds the $\theta_0 dT$ to be output to the C-axis current position (angle) and updates position information. Moreover, the NC device 1 calculates the X-axis position corresponding to the updated C-axis angle and sets the difference between the previous X-axis position and the current X-axis position to the output register as the moving amount FdT of the X-axis per control unit time.

At Step 8, the NC device 1 outputs the moving amounts $\theta_0 dT$ and FdT of the C-axis and the X-axis, respectively per control unit time set to the output register at Step 7 to the axial-data input/output unit 27. The NC device 1 also controls the C-axis division counter CTc to decrement.

At Step 9, the NC device 1 checks whether the content of the C-axis division counter CTc is "1". Therefore, when the content is not "1" (NO at Step 9), C-axis division control is not finished yet (except for the last division process) and the process returns to Step 7. The NC device 1 performs the division process for next control unit time at Steps 7 and 8. When the content is "1" (YES at Step 9), the process proceeds to Step 10 so as to perform the last process.

At Step 10, the NC device 1 processes a division angle similarly to that at Step 7. Because Step 10 is the last process, the NC device 1 outputs the remaining distance (angle) that is a fraction with respect to the commanded angle. The NC device 1 similarly calculates the moving amount FdT of the X-axis by which the X-axis moves up to the position corresponding to the C-axis commanded angle.

At Step 11, the NC device 1 outputs a moving amount $\theta 1 dT$ (serving as the remaining angle) and the FdT of the C-axis and the X-axis, respectively per control unit time set to the output register at Step 10 to the axial-data input/output unit 27. The NC device 1 also controls the C-axis division counter CTc to decrement.

By the above processes, the NC device 1 executes the virtual-Y-axis rapid-traverse command (G0) during the D-cut program for the virtual Y-axis control in a shortest time without any influence of the velocity clamping or the like because the C-axis is driven to rotate at the G0 velocity or the constant velocity corresponding to the G0. Also in the above descriptions, because the H-axis is controlled using the command values calculated for the C-axis and operates similarly to the C-axis, explanations of the H-axis will be omitted.

As described above, in the numerical control device 1 according to the first embodiment, the virtual-Y-axis rapid-traverse-command processor 16 analyzes the virtual-Y-axis rapid-traverse command transmitted to the Y-axis in the D-cut mode by the virtual Y-axis, and the C-axis-G0 interpolation processor 17 interpolates the C-axis angle in response to the analyzed virtual-Y-axis rapid-traverse command. For example, the C-axis-G0 interpolation processor 17 interpolates the C-axis angle with the constant velocity Vc (see FIG. 3(b)) at which the velocity clamping is inactive. The C-axis-constant-velocity-time X-axis interpolation processor 18 interpolates the X-axis position based on the C-axis angle interpolated by the C-axis-G0 interpolation processor 17. For example, the C-axis-constant-velocity-time X-axis interpolation processor 18 interpolates the X-axis position by calculating X coordinate values corresponding to respective interpolation positions (angles) on the C-axis so that a control point can be located on a Y-axis path. The numerical control device 1 outputs calculation results of these moving amounts of the respective axes to the respective servo control units 31 to 33 for the X-axis, the C-axis, the H-axis, and the Z-axis. The numerical control device 1 thereby controls the X-axis position (see FIGS. 3(b) to 3(d)) so as to rotate the C-axis while keeping the C-axis velocity to the constant velocity and to enable the virtual Y-axis to move substantially linearly. It is thereby possible to keep the C-axis velocity to the high velocity as a whole in the block in which the virtual Y-axis motion such as the return operation after the D-cut machining is made in rapid traverse. Because the virtual Y-axis rapid traverse motion can be executed at the high velocity, the execution time of the block being executed can be effectively reduced. This can efficiently reduce the machining cycle time of the machine tool MT that does not have the Y-axis and can improve the machining productivity of the numerical control device.

In the first embodiment, the numerical control device 1 controls the X-axis position so as to rotate the C-axis while keeping the C-axis velocity to the maximum velocity Vcmax (the G0 velocity) within the C-axis permissible velocity range and so as to enable the virtual Y-axis to move substantially linearly. It is thereby possible to execute the virtual-Y-axis rapid traverse motion at a considerably high velocity.

In the first embodiment, the numerical control device 1 controls the C-axis interpolation based on the division number according to the FdT ($\theta 0 dT$) serving as the constant value corresponding to, for example, the C-axis G0 velocity and the content of the C-axis division counter CTc. Alternatively, the numerical control device 1 can use a method of calculating the moving amount FdT per control unit time from the velocity command value including the remaining distance (angle) and the G0 every time and outputting the calculated moving amount FdT.

Second Embodiment

Figure 8:
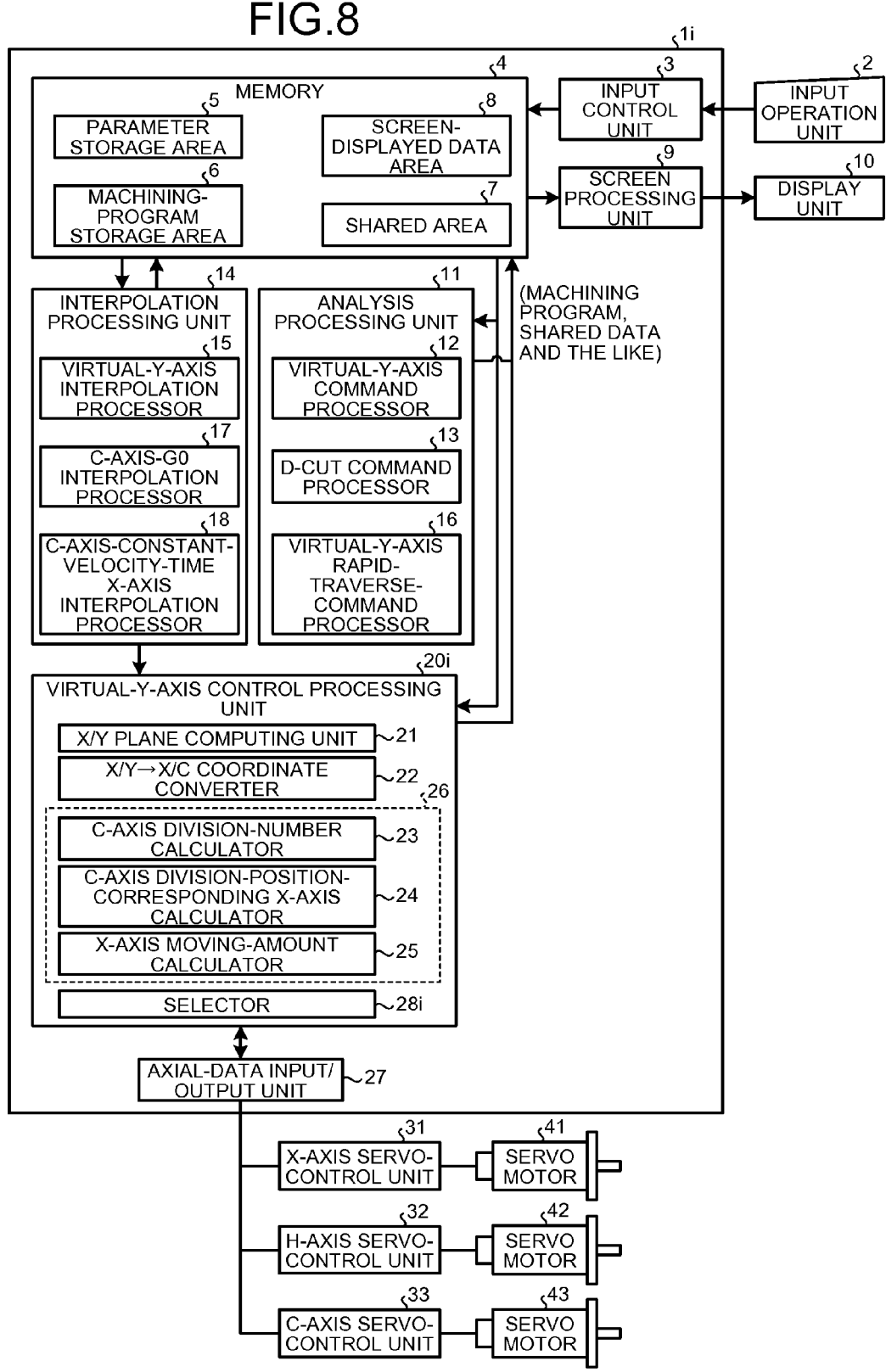
FIG. 8 depicts a configuration of a numerical control device according to a second embodiment.

A numerical control device $1i$ according to a second embodiment is explained next with reference to FIG. 8. FIG. 8 depicts a configuration of the numerical control device $1i$ according to the second embodiment. Features different from the first embodiment are mainly explained below.

In the first embodiment, the predetermined constant velocity to which the C-axis velocity is to be kept is preset to the numerical control device 1 (the C-axis division-number calculator 23, for example). In contrast, in the second embodiment, the constant velocity to which the C-axis velocity is to be kept can be selected from those within the C-axis permissible velocity range.

Specifically, a virtual-Y-axis control processing unit $20i$ of the numerical control device $1i$ further includes a selector $28i$ as shown in FIG. 8. The selector $28i$ selects one velocity from the C-axis permissible velocity range.

Figure 9:
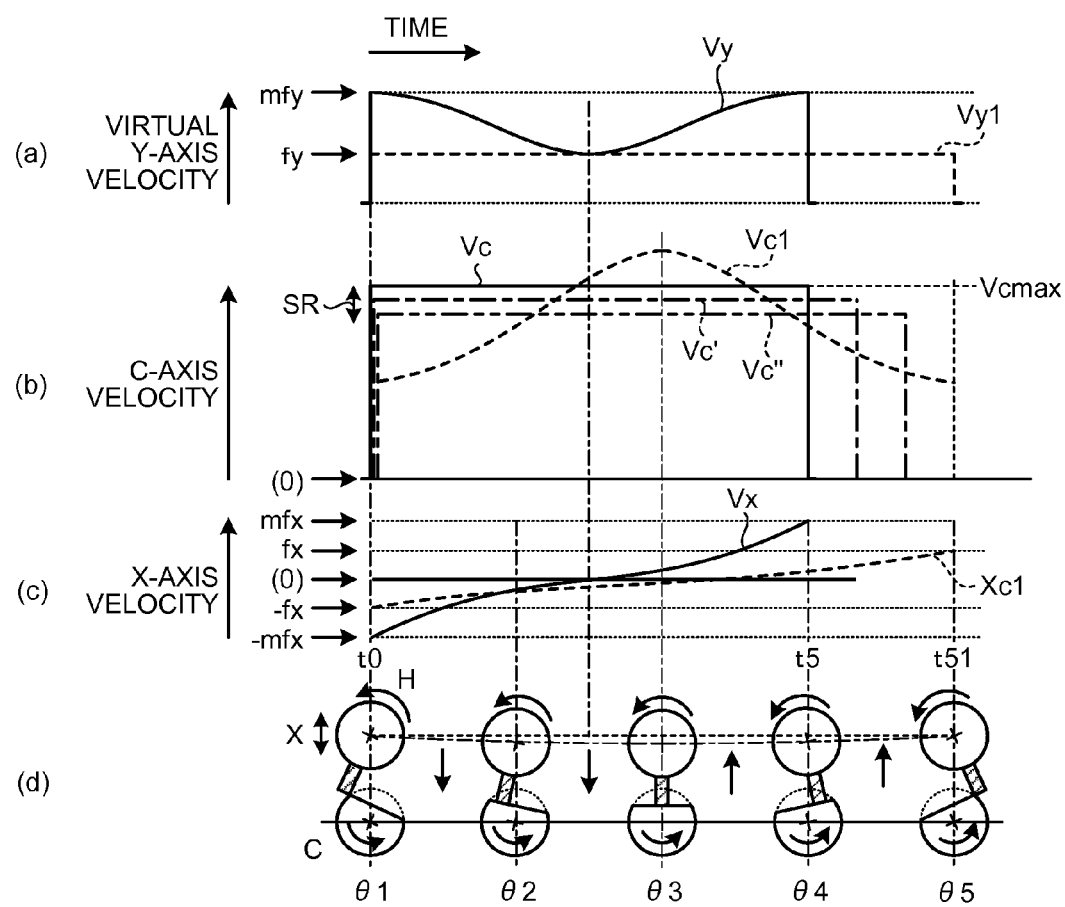
FIG. 9 depict operations performed by respective axes of the numerical control device at a time of a D-cut according to the second embodiment.

For example, a plurality of discrete velocities Vc, Vc', and Vc" shown in FIG. 9(b) can be prepared in a form of a table or the like, and the selector $28i$ can select one velocity out of the velocities Vc, Vc', and Vc". The Vc, Vc', and Vc" are those acquired experimentally in advance as, for example, those at which the C-axis can be driven to rotate in a shorter time than that where the C-axis rotates at the C-axis velocity Vc1 before the clamping in the comparative examples 1 and 2, as shown in FIGS. 9(a) to 9(d). For example, the velocity Vc is similar in value to that according to the first embodiment and is the maximum velocity Vcmax (the G0 velocity). For example, the velocity Vc is selected when a high priority is put to velocity and the "Vc" is selected when a high priority is put to accuracy.

Alternatively, for example, a continuous selection range SR as shown in FIG. 9(b) can be prepared and the selector $28i$ can select one velocity from the selection range SR. For example, the selection range SR is acquired experimentally in advance as the velocities at which the C-axis can be driven to rotate in a shorter time than that where the C-axis rotates at the C-axis velocity Vc1 before the clamping in the comparative examples 1 and 2. For example, the velocity Vc as an upper limit of the selection range SR is similar in value to that according to the first embodiment and is, for example, the maximum velocity Vcmax (the G0 velocity). For example, a velocity near the upper limit of the selection range SR is selected when a high priority is put to velocity and a velocity near a lower limit of the selection range SR is selected when a high priority is put to accuracy.

The C-axis division-number calculator 23 divides the C-axis rotation angle data converted by the X/Y→X/C coordinate converter 22 by the rotation angle (assumed as $\theta dT$) per control unit time corresponding to the velocity selected by the selector $28i$, and obtains the C-axis division number (rounds up the remainder). The numerical control device $1i$ thereby controls the X-axis position so as to rotate the C-axis while keeping the C-axis velocity to one velocity selected by the selector $28i$ and to enable the virtual Y-axis to move substantially linearly.

As described above, in the numerical control device $1i$ according to the second embodiment, the selector $28i$ selects one velocity from the C-axis permissible velocity range. The numerical control device $1i$ rotates the C-axis while keeping the C-axis velocity to one velocity selected by the selector $28i$ and controls the X-axis position to enable the virtual Y-axis to move substantially linearly. It is thereby possible to realize a control having a high degree of freedom for the constant velocity to which the C-axis velocity is to be kept and to expand an applicable range of the virtual-Y-axis rapid traverse motion.

INDUSTRIAL APPLICABILITY

As described above, the numerical control device according to the present invention is useful for controlling machine tools.

REFERENCE SIGNS LIST

1, $1i$ numerical control device
2 input operation unit
3 input control unit
4 memory
5 parameter storage area
6 machining-program storage area
7 shared area
8 screen-displayed data area
9 screen processing unit
10 display unit
11 analysis processing unit
12 virtual-Y-axis command processor
13 D-cut command processor
14 interpolation processing unit
15 virtual-Y-axis interpolation processor
16 virtual-Y-axis rapid-traverse-command processor
17 C-axis-G0 interpolation processor
18 C-axis-constant-velocity-time X-axis interpolation processor
20, $20i$ virtual-Y-axis control processing unit
21 X/Y plane computing unit
22 X/Y→X/C coordinate converter
23 C-axis division-number calculator
24 C-axis division-position-corresponding X-axis calculator
25 X-axis moving-amount calculator
26 D-cut-time Y-axis-rapid-traverse controller
27 axial-data input/output unit
$28i$ selector
31 X-axis servo-control unit
32 H-axis servo-control unit
33 C-axis servo-control unit
41, 42, 43 servo motor

The invention claimed is:

1. A numerical control device that controls a machine tool that includes a turret to which a tool is attached, the turret being configured to move along an X-axis and rotate on an H-axis, and further includes a workpiece rotatable on a C-axis, and wherein there is no direct movement of the machine tool along a Y-axis that is orthogonal to the X-axis, the numerical control device comprising:
  an analyzer that analyzes a y-axis rapid-traverse command in a Y-axis interpolation mode in which an X-Y-axis movement command in a machining program is converted into a command in an X-H-C coordinate system, an analysis result of the converted command is interpolated, and the X-axis, the H-axis, and the C-axis movements of the machine tool are cooperatively driven;
  a C-axis interpolation processor that interpolates a C-axis rotation angle range in response to the analyzed Y-axis rapid-traverse command; and
  an X-axis interpolation processor that interpolates an X-axis position based on the interpolated C-axis rotation angle range, wherein the numerical control device rotates the C-axis movement at a constant velocity during the entire C-axis rotation angle range, and accelerates an X-axis velocity of the turret accordingly, to thereby perform an operation corresponding to a predetermined Y-axis movement path command.

2. The numerical control device according to claim 1, wherein the constant velocity is a maximum velocity within a C-axis permissible velocity range, and the numerical control device controls the X-axis position so as to rotate the C-axis while keeping a C-axis velocity to the maximum velocity and to thereby perform the operation corresponding to the predetermined Y-axis movement path.

3. The numerical control device according to claim 1, further comprising a selector that selects one velocity out of velocities within a C-axis permissible velocity range, wherein the numerical control device controls the X-axis position so as to rotate the C-axis while keeping a C-axis velocity to the selected one velocity and to thereby perform the operation corresponding to the predetermined Y-axis movement path command.

* * * * *